Feb. 7, 1928.
F. G. WISWELL
1,658,272
WIRE GAUGING MECHANISM
Filed Aug. 1, 1922     2 Sheets-Sheet 1
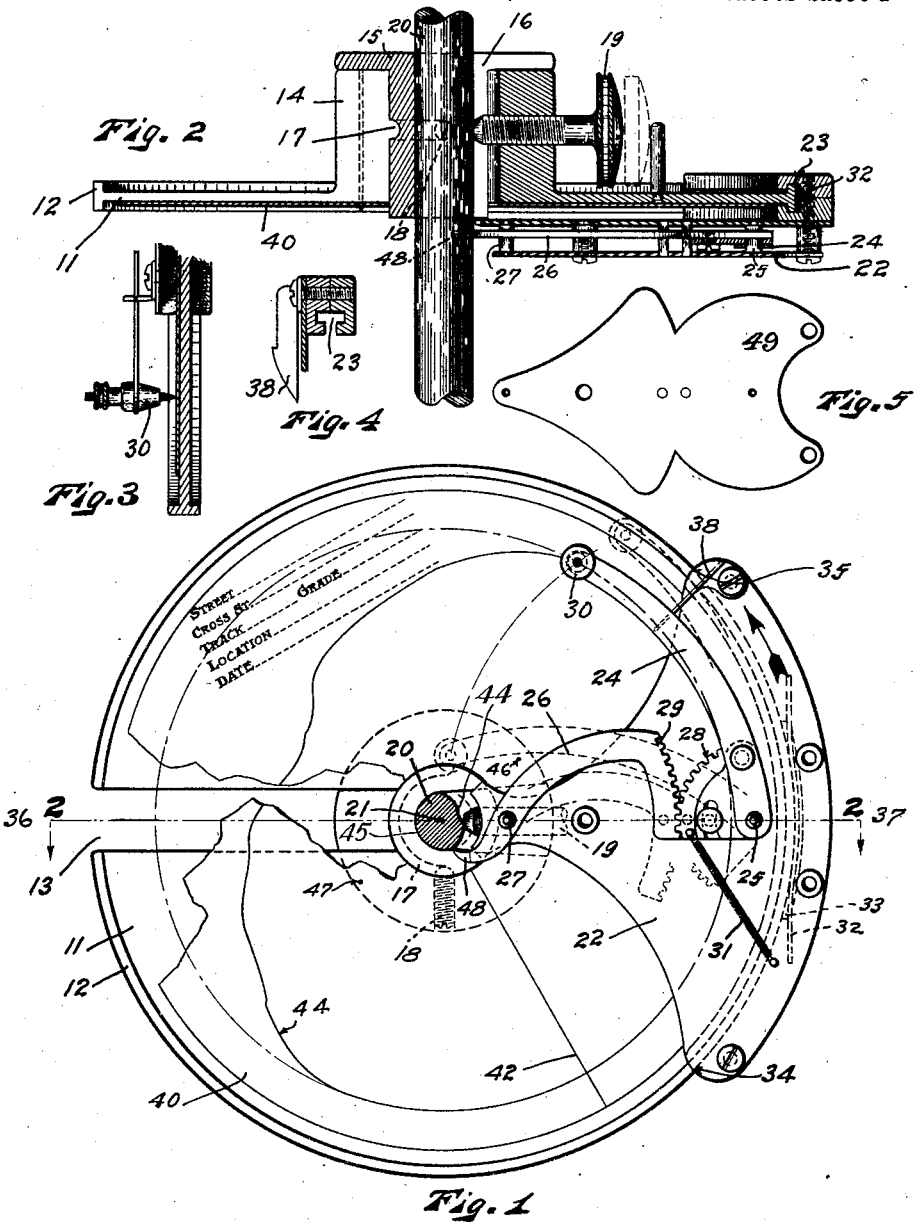
INVENTOR
Frederick G. Wiswell dec.
Margaret G. Wiswell – Administratrix
By G. Wright Arnold
ATTORNEY Feb. 7, 1928.

F. G. WISWELL 1,658,272

WIRE GAUGING MECHANISM

Filed Aug. 1, 1922

INVENTOR Dec.
Frederick G. Wiswell
Margaret G. Wiswell — Administratrix
By G. Wright Arnold
ATTORNEY Patented Feb. 7, 1928.

1,658,272

UNITED STATES PATENT OFFICE.

FREDERICK G. WISWELL, DECEASED, BY MARGARET G. WISWELL, ADMINISTRATRIX, OF SEATTLE, WASHINGTON.

WIRE-GAUGING MECHANISM.

Application filed August 1, 1922. Serial No. 578,878.

This invention relates to the art of wire mechanism. More particularly the invention relates to a mechanism for producing a graphic record of the contour, cross-sectionally considered, of a wire on an enlarged scale.

In many fields where wire or wire cable is employed it is necessary to make regular inspection to insure safety and guard against the breaking of the same. Such manifest fields of use obtain in trolley wires and wire cables employed in hoisting operations, such as in elevators. While the application will be described particularly as applied to the problems and conditions inherent in trolley wire use by traction companies, nevertheless, it is not to be presumed that the application of the invention is limited to any such narrow field, but the same is co-extensive in all fields where the device constituting the invention may be employed or where like conditions and difficulties obtain in part or altogether.

Trolley wire is composed of copper, a metal which relatively wears away easily. Since the trolley pulley is maintained in contact with the trolley wire by pressure only and is otherwise free, it is a matter of common experience for the trolley to become disengaged from the trolley wire and the momentum of the car carries it forward, causing the trolley pole to strike with great violence against the cross-wires which support the trolley wire. Thus, it often happens that there is a break in the trolley wire, resulting in the tying up and blocking of traffic with incident costly delay pending the repair of the trolley wire. Hence it is important that the condition of the trolley wire be carefully watched and rigid inspection maintained to guard against permitting such wear to proceed to the point where the trolley wire will not sustain the strains to which it is subjected. Great expense is therefore involved in ascertaining the condition of the trolley wire and inspecting the same. Mere observation is not sufficient for the eye cannot be depended upon to detect the extent of the wear.

Heretofore, the practice in determining the amount of wear of trolley wire has varied with the purpose of the inspection. For appraisal purposes, the practice has been to cut out sections of the trolley wire and weigh the same to determine the extent of the wear. Obviously such a method is unsatisfactory since it gives no accurate measure of the utility of the wire,—part may be greatly worn while the wire as a whole may be in fair condition. Also, the great expense of taking down and reinstallation renders any such method highly objectionable. Also the use of micrometer calipers has been employed but obviously any such process is slow and tedious and expensive, involving separate tabulation and calculation of all data. A condition which complicates the inspection work is that the trolley wire does not wear uniformly, but in certain parts of the city where its use is increased by the passing of a large number of cars or other causes, its wear is much more rapid. Also those sections where the car must be stopped and started most frequently also gives rise to greater wear on the trolley wire, so that throughout the entire system there are sections of the wire which are subjected to much more wear than other sections. A further condition to be met in the inspection of the trolley wire is that it should be done without interfering with traffic.

In general the object of the invention is to overcome the objections of the means heretofore provided. A primary object of the invention is to provide a device which will reproduce in record form the exact contour of a trolley wire or other wire or cable on an enlarged scale, said contour being preferably disposed within an enlarged outline of said wire or cable, said outline representing the true form of the wire or cable previous to its being worn whereby the shrinkage induced by wear is graphically shown. A further primary object of the invention is to provide a device that will produce accurate records relative to the character of wear of the trolley wire without interfering with traffic even when the cars are running on a one and one-half minute schedule, that is, the primary object of the invention is to provide a device which may be utilized in making its record expeditiously. A further object of the invention is to provide a mechanism to make said records of the character of a trolley wire or cable which may be readily adapted to any form of trolley wire or cable whether the same be round, grooved or of a figure 8 contour, cross-sectionally considered; and further to provide such a mechanism as will be adapted to different sizes of said trolley wire or cable. A further primary object of the invention is to provide such a device as will be simple in its operation and yet satisfy the fundamental requisite of accuracy. A further primary object is to provide such a mechanism as above referred to which will require but two operators, one of whom is the tower-truck driver. And finally, a primary object of the invention is to provide such an instrument as will produce the chart directly, and at the time of inspection, in a form which may be filed for further reference and purposes of comparison thus avoiding subsequent tracing or tabulation.

The above mentioned general objects of the invention together with others inherent in the same are attained by the mechanism illustrated in the following drawings, the same being merely preferred exemplary forms of embodiment of the invention, thruout which drawings like reference numerals indicate like parts:

Figure 1 is a view from above with the cover plate removed, of a wire gauging mechanism embodying the invention applied to a trolley wire the original contour of which is round in the instance herein chosen for illustration;

Fig. 2 is a view in section on dotted line 2, 2 of Fig. 1;

Fig. 3 is a view of the pencil and the end portion of the pencil arm in position on a portion of the record and disk;

Fig. 4 is a view of a detail of said wire gauging mechanism;

Fig. 5 is a view of the carriage cover plate;

Figure 6:
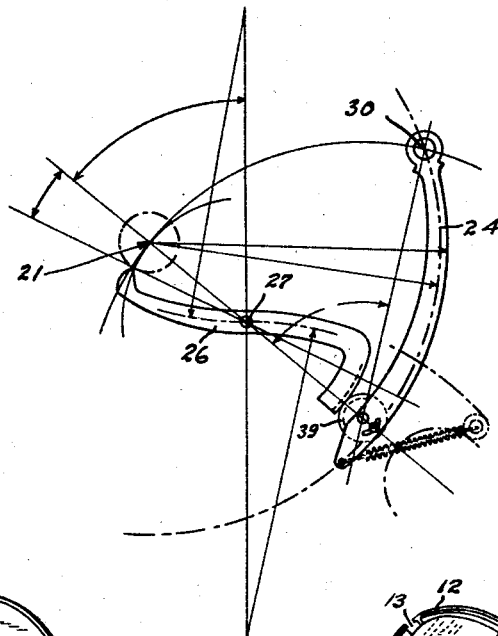
Fig. 6 is a view of a modified form of the pencil arm and shows the relationship between parts of the device.
Figure 7:
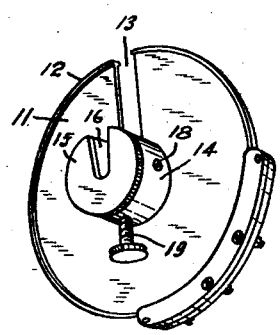
Fig. 7 is a view in perspective of the underside of a device embodying the invention.
Figure 8:
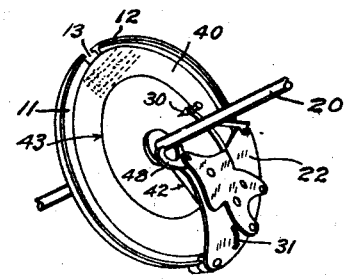
Fig. 8 is a view in perspective of the upperside of a device embodying the invention.
Figure 9:
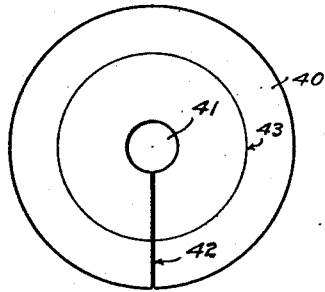
Fig. 9 is a view of a chart record blank.
Figure 10:
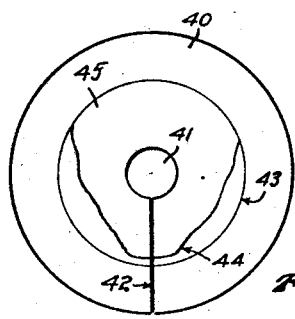
Fig. 10 is a view of a record blank with record made thereon.

A supporting disk 11 preferably having a track-like flange 12 is provided with a radially disposed wire receiving slot 13 and with a hub 14, said slot 13 extending through said hub 14. Revolvably and axially disposed in said hub 14 is a wire embracing or chambering member 15 preferably in the form of a bushing, having a radially disposed wire receiving slot 16, said bushing being mounted so that it may be turned to cause its slot 16 to register with slot 13 of the disk. The peripheral surface of said bushing or chambering member 15 as illustrated is provided with a groove 17 for an arc covering about 180° in length. A pin 18 carried by and extending from the hub 14 protrudes into this groove, and functions to rotatably hold the chambering member 15 in place in the hub 14. A thumb-screw 19 carried by the hub 14 serves to clamp both the chambering member and the disk fixably to the wire 20 and cause the diametrical center 21 of the wire constituting the subject of inspection to coincide with the diametrical center of the disk, as well as the diametrical center of the record blank hereinafter described,— said center for the wire, disk, and record to be designated by the one reference numeral 21.

A carriage 22 preferably of sector form having a cover plate 49 is mounted upon said track-like flange 12 of the disk having a T-formed recess 23 to embrace said track-like flange 12 which maintains said carriage in parallel position over said disk while the mounting or support is confined to the peripheral portion of the disk. On this carriage 22 is mounted the recording means which may consist of a pencil arm 24 pivoted at 25 and a tracing arm 26 pivoted at 27, said arms having segment gears 28 and 29 respectively. These gears intermesh, thereby establishing a connection between the two arms whereby movement of the one causes a predetermined proportional movement of the other. A pencil or pen point 30 is provided on the end of the pencil arm 24. A spring 31 urges the said pencil point towards the diametrical center 21.

A spring 32 is disposed in the recess 33 adjacent recess 23 to cause said carriage to maintain a predetermined fixed radial distance from the center 21. This spring 32 is preferably positioned in the middle of the arc 34, 35 of the carriage 22 so that the said carriage is held squarely against the disc, for which purpose said spring 32 is caused to extend with equal bearing on each side of the line 36, 37 which passes through the middle point of the arc 34, 35 and the center 21, on which line the pivot points 27 and 25 are preferably disposed. A pencil holding catch 38 is preferably provided to hold said pencil 30 when the device is being applied to the wire 20 to be inspected or at such other times as may be desired.

Instead of having the pivot point 27 of the tracing arm as close to the wire as is shown in Fig. 1, it may well be placed further back and preferably positioned as shown in Fig. 6, that is, so that the pivot point is located at about the middle of said arm. A gear 39 is preferably provided in place of the segment gear 28. This results in cutting down the tendency to inaccuracy in course of time due to wear of gears.

The mode of operation of the invention is as follows: The application of the device embodying the invention to the wire to be tested is accomplished by revolving the wire embracing member 15 until its slot 16 registers with the slot 13 of the disk. In the case of the trolley wire, the under side 44 of the wire 20 is the part that is engaged by the trolley pulley (not shown) carried by the street car and therefore this under side is the part that becomes worn and deformed as to its contour. The upper side 45 of the wire ordinarily retains its original contour which is here assumed to be circular. The device is then caused to engage the wire 20 by pushing it upon the wire 20 through slots 13 and 16 until the said wire 20 occupies the center of the disk 11, which is also the center of the chambering member 15. That is the center of the wire is caused to be disposed at the center 21 of the disk 11 and wire chambering member 15. The chambering member 15 is then turned 180° so that the slot 13 is oppositely disposed to the slot 16 thereby causing the wire to be embraced or enchambered by the member 15. The set screw 19 is then screwed down so that the undeformed or upper part 45 of the wire 20 is caused to press securely against that part of the bushing opposite to the slot 16, making the center of the wire 20 to coincide with the center 21 of the disk 11 and the chambering member 15.

Thereupon the record blank 40 is pressed upon the disk by pulling apart the sides of the blank adjacent the slit or cut 42 and causing the blank, while being applied, to straddle the member 15 and wire 20 so that the central opening 41 of the record blank shall embrace the chambering member which protrudes slightly beyond the surface of the disk 11. The record blank is then passed down upon the pin points 46 and 47 which maintain the said blank fixedly secured to the disk 11 so that it will not rotate as respects the disk. The record blank is preferably disposed upon the disk with the slit or cut 42 oppositely disposed to the slot 13 of the disk.

The pencil arm 24 is then released from its catch 38 which permits the spring 31 to cause the pencil arm to rotate towards the center of the disk. Also be it noted, the pencil arm 24 is so mounted that it functions as a spring, pressing the pencil 30 down upon the record blank. In doing this the tracing arm 26 is also rotated simultaneously with the pencil arm 24 by reason of the gear connections 28 and 29 until its hardened point 48 presses upon the wire. That is the surface of the wire upon engaging the point 48 stops the rotating of the pencil arm 24. Revolving the carriage 22, preferably in direction of the arrow as illustrated, to cause the point 48 to engage the undeformed part of the wire, if any, will cause the pencil arm to stop its rotating at a time when the pencil reaches the circle on the record blank, since said circle represents the true contour of the wire when it is undeformed by wear. In fact, this is the test of whether the instrument is properly adjusted. Thereupon, carriage 22 is moved counter-clockwise in the form of the device as herein illustrated and obviously the tracing point 48 of the tracing arm 26 being yieldingly pressed against the wire will follow the contour of the wire and when the contour of this wire moves toward the center 21 of the wire, as it does on the worn under side portion 44, which is also the center of the enlarged circle 43 of the record blank 40, the tracing point 48 will likewise move towards said center. Manifestly, in doing this it will cause the pencil arm 24 likewise to move towards said center and as the carriage 22 is moved around the disk counter-clockwise, the pencil arm will trace the contour line 44 of the worn portion on a predetermined proportional enlarged scale upon the record blank. The contour line of the worn part manifestly will lie inside of the contour line 43 of the record which represents the original unworn wire. The part between the contour lines 43 and 44 manifestly represents the part of the wire that has been worn away. A few measurements of this worn segment will serve in connection with prepared tables to give accurately the area thus worn away so that the degree of wear can be accurately computed as well as being graphically illustrated on the chart. However, a planimeter may be employed and the worn area may be quickly ascertained by this means.

It will be noted that the carriage 22 is mounted upon the track-like flange of the disk and preferably is carefully maintained in fixed relation to the center 21 of the disk by means of the spring 32 so that the tracing arm 26 is free to follow exactly the contour of the wire as the carriage is moved or rotated about the center 21. The pencil arm 24 moves in a circle which passes through the center 21 of the wire, that is, the radius is equal to the distance from the pivot point 25 of the pencil arm to the center 21, or from the pivot point 25 to the center of the pencil point 30.

In the above I have described the invention with reference to the situation where there remains some unworn surface of the wire or cable to be gauged. In this connection, it is possible to use on the record blank the reference circle 43, and since the device is adjusted using the unworn portion of the wire as the basis of said adjustment, it is possible to reproduce the contour of the worn portion in a manner already described, so that it may be compared to the reference circle 43 point by point. Nevertheless it is manifest that this constitutes only the most desired arrangement.

In the event that there is no portion of the original surface of the wire unworn, i. e., if the wire is worn throughout its circumference, it is manifest that the device is so designed that it will truly and accurately trace the contour of the wire. But in this connection the reference circle could not be used as a basis for comparison point by point, although it is clear that said circle would constitute a general graphic reference means to judge the portion of the wire which is worn away.

Instead of a knife-like tracing point 48 this tracing point might be simply a sharp needle-like point where the wire to be traced is of uneven surface such as in a wire cable. The chambering member 15 may obviously be provided with any form of a receiving recess to fit the particular wire to be inspected. The part opposite the slot 16 is of a form to hold the center of the wire in the center of the chambering member and manifestly must be changed for different sizes of wire to always maintain this relationship.

Obviously, changes may be made in the forms, dimensions, and arrangement of the parts of the invention, without departing from the principle thereof, the above setting forth only preferred forms of embodiment.

What is claimed is:

1. A wire-gauging mechanism embodying a supporting disk having a wire receiving slot therein; a wire chambering member centrally disposed in said disk; a carriage mounted on said supporting disk; and recording means mounted on said carriage.

2. A wire-gauging mechanism embodying a supporting disk having a wire receiving slot therein; a wire chambering member centrally disposed in said disk; means whereby said disk may be fixedly clamped to said wire; a carriage mounted on said supporting disk; and recording means mounted on said carriage.

3. A wire-gauging mechanism embodying a supporting disk having a wire receiving slot and a track-like flange disposed on the periphery of said disk; a wire chambering member centrally disposed in said disk; means whereby said disk may be fixedly clamped to said wire; a carriage mounted on the track-like flange of said supporting disk; and recording means mounted on said carriage.

4. A wire-gauging mechanism embodying a supporting disk having a wire receiving slot therein; a wire chambering member consisting of a bushing revolvably disposed in the diametrical center of the disk and having a wire receiving slot; means whereby said chambering member and disk may be fixedly clamped to the wire; a carriage mounted on said supporting disk; and recording means mounted on said carriage.

5. A wire-gauging mechanism embodying a supporting disk having a wire receiving slot therein; a wire chambering member consisting of a bushing revolvably disposed in the diametrical center of the disk and having a wire receiving slot; means whereby said chambering member and disk may be fixedly clamped to the wire; a carriage mounted on said supporting disk; a pencil arm and a tracing arm pivotally mounted on said carriage; means connecting said two arms whereby movement of the one may be transmitted to the other; and recording means mounted on said carriage.

6. A wire-gauging mechanism embodying a supporting disk having a wire receiving slot therein; a wire chambering member consisting of a bushing revolvably disposed in the diametrical center of the disk and having a wire receiving slot; means whereby said chambering member and disk may be fixedly clamped to the wire; a carriage mounted on said supporting disk; a pencil arm and a tracing arm pivotally mounted on said carriage; a spring urging one end of the pencil arm to diametrical center; means connecting said two arms whereby movement of the tracing arm causes a predetermined measured movement of the pencil arm; and recording means mounted on said carriage.

7. A wire-gauging mechanism embodying a supporting disk having a wire receiving slot therein and a track-like flange disposed on the periphery of said disk; a wire chambering member consisting of a bushing revolvably disposed in the diametrical center of the disk and having a wire receiving slot; means whereby said chambering member and disk may be fixedly clamped to the wire; a carriage mounted on the track-like flange of said supporting disk; a pencil arm, having a segment gear, pivotally mounted on said carriage, a wire contour tracing arm having a segment gear intermeshing with said pencil arm gear, pivotally mounted on said carriage; a spring urging one end of said pencil arm to diametrical center; and a spring maintaining the carriage in predetermined position with respect to the diametrical center of the disk.

8. A wire-gauging mechanism embodying a supporting disk having a wire receiving slot therein and a track-like flange disposed on the periphery of said disk; a wire chambering member consisting of a bushing, revolvably disposed in the diametrical center of the disk and having a wire receiving slot, the contour of the bottom of said slot corresponding to the unworn contour of the wire to be measured, whereby the axial center of the wire is caused to coincide with the axial center of the supporting disk; means whereby said chambering member and disk may be fixedly clamped to the wire; a carriage mounted on the track-like flange of said supporting disk; a pencil arm, having a segment gear, pivotally mounted on said carriage, a wire contour tracing arm having a segment gear intermeshing with said pencil arm gear, pivotally mounted on said carriage; a spring urging one end of said pencil arm to diametrical center; and a spring maintaining the carriage in predetermined position with respect to the diametrical center of the disk.

9. A wire-gauging mechanism embodying a supporting disk having a wire receiving slot therein and a track-like flange disposed on the periphery of said disk; a wire chambering member consisting of a bushing revolvably disposed in the diametrical center of the disk and having a wire receiving slot, the contour of the bottom of said slot corresponding to the unworn contour of the wire to be measured, whereby the axial center of the wire is caused to coincide with the axial center of the supporting disk; means whereby said chambering member and disk may be fixedly clamped to the wire; a carriage mounted on the track-like flange of said supporting disk; a pencil arm, having a segment gear, pivotally mounted on said carriage; a wire contour tracing arm having a segment gear intermeshing with said pencil arm gear, pivotally mounted on said carriage; a spring urging one end of said pencil arm to diametrical center; a spring maintaining the carriage in predetermined position with respect to the diametrical center of the disk; and a record blank, having a radially disposed cut or slit therein and an axial opening of a size equal to that of the chambering member over which the said blank may be placed, and having an outline traced thereon corresponding to and bearing a known ratio to the wire before being worn.

10. A wire-gauging mechanism embodying a supporting disk having a wire receiving slot therein and a track-like flange disposed on the periphery of said disk; a wire chambering member consisting of a bushing revolvably disposed in the diametrical center of the disk and having a wire receiving slot, the contour of the bottom of said slot corresponding to the unworn contour of the wire to be measured, whereby the axial center of the wire is caused to coincide with the axial center of the supporting disk; means whereby said chambering member and disk may be fixedly clamped to the wire; a carriage mounted on the track-like flange of said supporting disk; a pencil arm, having a segment gear, pivotally mounted on said carriage; a wire contour tracing arm having a segment gear intermeshing with said pencil arm gear, pivotally mounted on said carriage; a spring urging one end of said pencil arm to diametrical center; a spring maintaining the carriage in predetermined position with respect to the diametrical center of the disk; a record blank, having a radially disposed slot therein and an axial opening of a size equal to that of the chambering member over which the said blank may be placed, and having an outline traced thereon corresponding to and bearing a known ratio to the wire before being worn; and means to hold said blank in fixed position in said supporting disk.

11. In combination with a wire gauging mechanism, the combination of a supporting disk; a wire chambering member centrally disposed in said disk; and a carriage mounted upon and disposed to rotatively move about the periphery of said disk.

12. In combination with a wire gauging mechanism, the combination of a supporting disk having a wire receiving slot therein; and a wire embracing or chambering member axially and rotatively disposed in said disk, said member having a wire receiving slot registrable with said disk slot.

13. In combination with a wire gauging mechanism a record blank having a hole disposed in the center thereof, the center of said blank coinciding with the center of the wire to be gauged; a contour outline traced on said blank corresponding to and bearing a known ratio to the wire to be gauged before being worn; and recording means operatively disposed above said blank having a tracing arm disposed to bear upon the worn section of said wire upon the wire to be gauged whereby the portion of said wire worn away may be graphically shown.

14. In combination with a wire gauging mechanism, the combination of a supporting disk; a wire chambering member centrally disposed in said disk; a carriage mounted upon and disposed to rotatively move about the periphery of said disk; a pencil arm and a tracing arm pivotally mounted on said carriage, the pivotal point of both the said arms being in a straight line coinciding with the radius of said supporting disk.

In witness whereof, I hereunto subscribe my name this 26th day of July, A. D. 1922.

MARGARET G. WISWELL,
*Administratrix of the Estate of Frederick G. Wiswell, deceased.*